United States Patent
Lei et al.

(10) Patent No.: US 6,467,457 B1
(45) Date of Patent: Oct. 22, 2002

(54) INJECTOR ACTUATING FLUID CHECK AND METHODS

(75) Inventors: Ning Lei, Oak Brook, IL (US); Martin R. Zielke, Lockport, IL (US); Kenneth R. Seymour, II, Villa Park, IL (US); James H. Yager, St. Charles, IL (US); Xilin Yang, Lombard, IL (US)

(73) Assignee: International Engine Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/694,637

(22) Filed: Oct. 23, 2000

Related U.S. Application Data (63) Continuation-in-part of application No. 09/653,051, filed on Sep. 1, 2000.
(60) Provisional application No. 60/197,572, filed on Apr. 17, 2000, and provisional application No. 60/161,330, filed on Oct. 25, 1999.

(51) Int. Cl.[7] .............................................. F02M 37/04
(52) U.S. Cl. ....................................... 123/456; 123/467
(58) Field of Search .................................. 123/446, 456, 123/467, 468, 469, 470; 137/614.2

(56) References Cited

U.S. PATENT DOCUMENTS

| | | | |
|---|---|---|---|
| 3,742,926 A | * 7/1973 | Kemp ........................ | 123/467 |
| 4,286,563 A | 9/1981 | Magdi et al. | |
| 4,295,452 A | 10/1981 | Lembke et al. | |
| 4,577,606 A | * 3/1986 | Bohringer et al. .......... | 123/467 |
| 4,628,957 A | * 12/1986 | Hofer ......................... | 123/467 |
| 4,751,904 A | 6/1988 | Hudson | |
| 4,776,615 A | 10/1988 | Young | |
| 4,964,391 A | * 10/1990 | Hoover ....................... | 123/510 |
| 4,996,961 A | 3/1991 | Usui | |
| 4,996,962 A | 3/1991 | Usui | |
| 5,058,554 A | 10/1991 | Takeda et al. | |
| 5,143,039 A | 9/1992 | Gmelin | |
| 5,168,855 A | * 12/1992 | Stone ......................... | 123/446 |
| 5,211,149 A | 5/1993 | DeGrace, Jr. | |
| 5,273,015 A | 12/1993 | Yonekawa et al. | |
| 5,297,523 A | * 3/1994 | Hafner et al. ............... | 123/456 |
| 5,299,542 A | 4/1994 | Hafner | |
| 5,372,113 A | 12/1994 | Smith | |
| 5,423,303 A | 6/1995 | Bennett | |
| 5,509,391 A | * 4/1996 | Degroot ....................... | 123/467 |
| 5,511,528 A | * 4/1996 | Iwanaga et al. ............ | 123/467 |
| 5,517,972 A | * 5/1996 | Stockner ..................... | 123/496 |
| 5,531,202 A | 7/1996 | Lorraine | |
| 5,603,302 A | * 2/1997 | Minagawa et al. ......... | 123/456 |
| 5,806,494 A | 9/1998 | Glassey | |
| 5,832,954 A | * 11/1998 | Shafer ........................ | 123/467 |
| 5,842,452 A | * 12/1998 | Pattanaik .................... | 123/467 |
| 5,950,669 A | * 9/1999 | Fehlmann et al. .......... | 123/467 |
| 5,954,032 A | * 9/1999 | Augustin et al. ........... | 123/456 |

FOREIGN PATENT DOCUMENTS

| | | |
|---|---|---|
| DE | 19606946 | 9/1997 |
| DE | 19734669 | 9/1998 |
| DE | 19735665 | 1/1999 |
| EP | 0829640 | 3/1998 |
| GB | 2021720 | 12/1979 |

\* cited by examiner

*Primary Examiner*—Thomas N. Moulis
(74) *Attorney, Agent, or Firm*—Dennis Kelly Sullivan; Jeffrey P. Calfa; Neil T. Powell (57) ABSTRACT

A connector assembly and the actuating system including the connector assembly, the connector assembly for fluidly coupling an actuating fluid rail to a fuel injector, the actuating fluid rail conveying a quantity of actuating fluid, the fuel injector having an actuating fluid inlet, the connector assembly includes a check valve operably disposed in a connecting member for controlling the flow of actuating fluid between the actuating fluid rail and the fuel injector. The connecting member has a fluid passageway defined therein, the fluid passageway being in fluid communication with the actuating fluid rail and the fuel injector actuating fluid inlet. A method of minimizing negative pressure effects caused by operation of a fuel injector on the actuating fluid in an actuating fluid rail and a method of providing a high pressure actuating fluid flow from a high pressure pump to a plurality of fuel injectors of a diesel engine are further included.

34 Claims, 9 Drawing Sheets

FIG. 9
PRIOR ART
HIGH PRESSURE SYSTEM SCHEMATIC

FIG. 10

INJECTOR ACTUATING FLUID CHECK AND METHODS

RELATED APPLICATIONS

The present application claims the benefit of U.S. Provisional Application No. 60/197,572 filed Apr. 17, 2000, and U.S. Provisional Application No. 60/161,330 filed Oct. 25, 1999, which are incorporated herein in their entirety by reference, and is a continuation-in-part of U.S. patent application Ser. No. 09/653,051, filed Sep. 1, 2000 and incorporated in its entirety by reference.

TECHNICAL FIELD

The present invention relates generally to hydraulically actuated fuel injection systems. More particularly, the present invention relates to devices for minimizing pressure fluctuations in the actuating fluid system.

BACKGROUND OF THE INVENTION

Hydraulically actuated, electronically controlled unit injection systems (HEUI) injectors require a source of high pressure actuating fluid. Each of the fuel injectors of an engine is typically serviced by a common high pressure actuating fluid rail. The rail usually runs along the head of a bank of cylinders. In the past, tubular connectors have extended between the rail and individual injectors for conveying high pressure actuating fluid to the injector. It is important for both engine performance and engine noise emission considerations that each injector have a stable source of high pressure actuating fluid.

Figure 9:
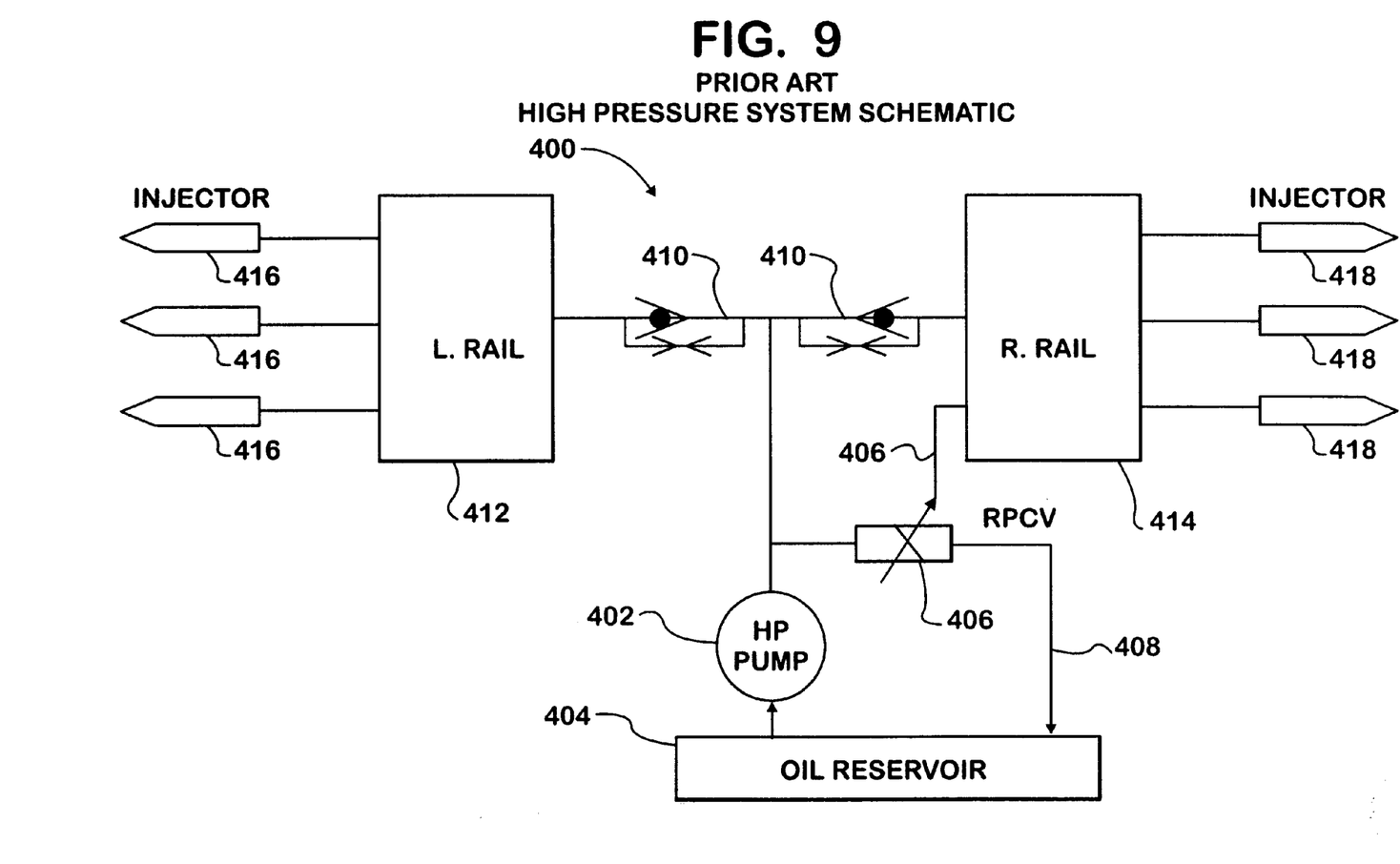
FIG. 9 is a schematic representation of a prior art high pressure actuating fluid system for a V type engine.

Each HEUI injector has an internal actuator that turns on and off the high pressure actuating fluid to the injector. The cycling of the actuator, at least once every injection event, may cause a water hammer effect that is transmitted through the connector to the rail. The water hammer effect causes pressure instability in the rail and is also a source of objectionable engine noise emission. In the prior art, for V-form engines, a check valve or check valves have been interposed in the plumbing that connects the two high pressure rails serving each bank of cylinders. Such a design is the subject of U.S. Pat. No. 5,168,855 to Stone and an exemplary schematic of this design is presented in prior art FIG. 9. The prior art actuating fluid system 400 includes a high pressure pump 402 that draws actuating fluid from a low pressure reservoir 404. A rail pressure control valve 406 monitors (via sensor communication 407) and controls the maximum pressure in the rails by dumping pressure back to the reservoir 404 via fluid ling 408 under certain conditions. The design of the prior art system 400 is for a V form engine of six cylinders (and, in fact, is inapplicable to an engine with a single bank of cylinders serviced by a single rail). Accordingly, a check valve 410 is disposed in the fluid line to the left rail 412 and a check valve is disposed in the fluid line to the right rail 414. Each of the rails 412, 414 supplies high pressure actuating fluid directly to the three injectors 416, 418 on the bank of cylinders served by the respective rail 412, 414. A pressure fluctuation emanating from an injector 416 is isolated for the right rail 414 and the injectors 418 serviced by the right rail by the check valves 410. A pressure fluctuation emanating from a certain injector 416 is translated to the left rail 412 and may affect the operation of the other two injectors 416. The check valves 410 provide no isolation in the last mentioned case. This last mentioned case is analogous to an inline engine having a single bank of cylinders.

While the mechanization of the '855 patent may partially alleviate cross talk between the two high pressure actuating fluid rails of a V-type engine, the mechanization does nothing to deal with the instabilities induced in a single rail by all of the injectors serviced by that rail. Accordingly, there is a need in the industry to minimize the pressure pulses reaching a high pressure actuating fluid rail from a specific injector. Such means of control should act to stabilize the pressure in the affected high pressure actuating fluid rail as well as minimizing emission noise emanating from the rail due to the presence of the water hammer effect caused by the individual injectors.

Additionally, as indicated above, the mechanization of the '855 patent simply does not address the problem of an inline engine with a single high pressure actuating fluid rail. All of the injectors serviced by such a rail, typically six or more, are free to send pressure waves through the high pressure actuating rail. Accordingly, there is a further need in the industry for a means to correct the aforementioned problem as it exists in inline engines as well as the problem existing in V-type engines.

SUMMARY OF THE INVENTION

The connector assembly of the present invention substantially meets the aforementioned needs of the industry. Each injector serviced by a high pressure actuating fluid rail is in fluid communication with the rail by means of a connector assembly of the present invention. Each connector assembly of the present invention includes a check valve that is seated by the pressure of the water hammer effect caused by the closing of the injector actuator. Such closing substantially prevents transmission of the water hammer effect to the rail. By containing the water hammer effect, the noise emitted from the rail is substantially reduced. Further, pressure of the high pressure actuating fluid in the rail is substantially stabilized, thereby improving the performance of each of the injectors serviced by the rail.

A further benefit of the connector assembly of the present invention is that it can be utilized to control injector inlet volume and pressure. Such control is beneficial in minimizing the quantity of fuel injected during the pilot injection portion of an injection event. Such control acts to minimize noise emissions from the engine and to improve drivability.

The present invention is a connector assembly and the actuating system including the connector assembly, the connector assembly for fluidly coupling an actuating fluid rail to a fuel injector, the actuating fluid rail conveying a quantity of actuating fluid, the fuel injector having an actuating fluid inlet, the connector assembly includes a check valve operably disposed in a connecting member for controlling the flow of actuating fluid between the actuating fluid rail and the fuel injector. The connecting member has a fluid passageway defined therein, the fluid passageway being in fluid communication with the actuating fluid rail and the fuel injector actuating fluid inlet. The present invention is further a method of minimizing negative pressure effects caused by operation of a fuel injector on the actuating fluid in an actuating fluid rail and a method of providing a high pressure actuating fluid flow from a high pressure pump to a plurality of fuel injectors of a diesel engine.

DETAILED DESCRIPTION OF A PREFERRED EMBODIMENT

Figure 1:
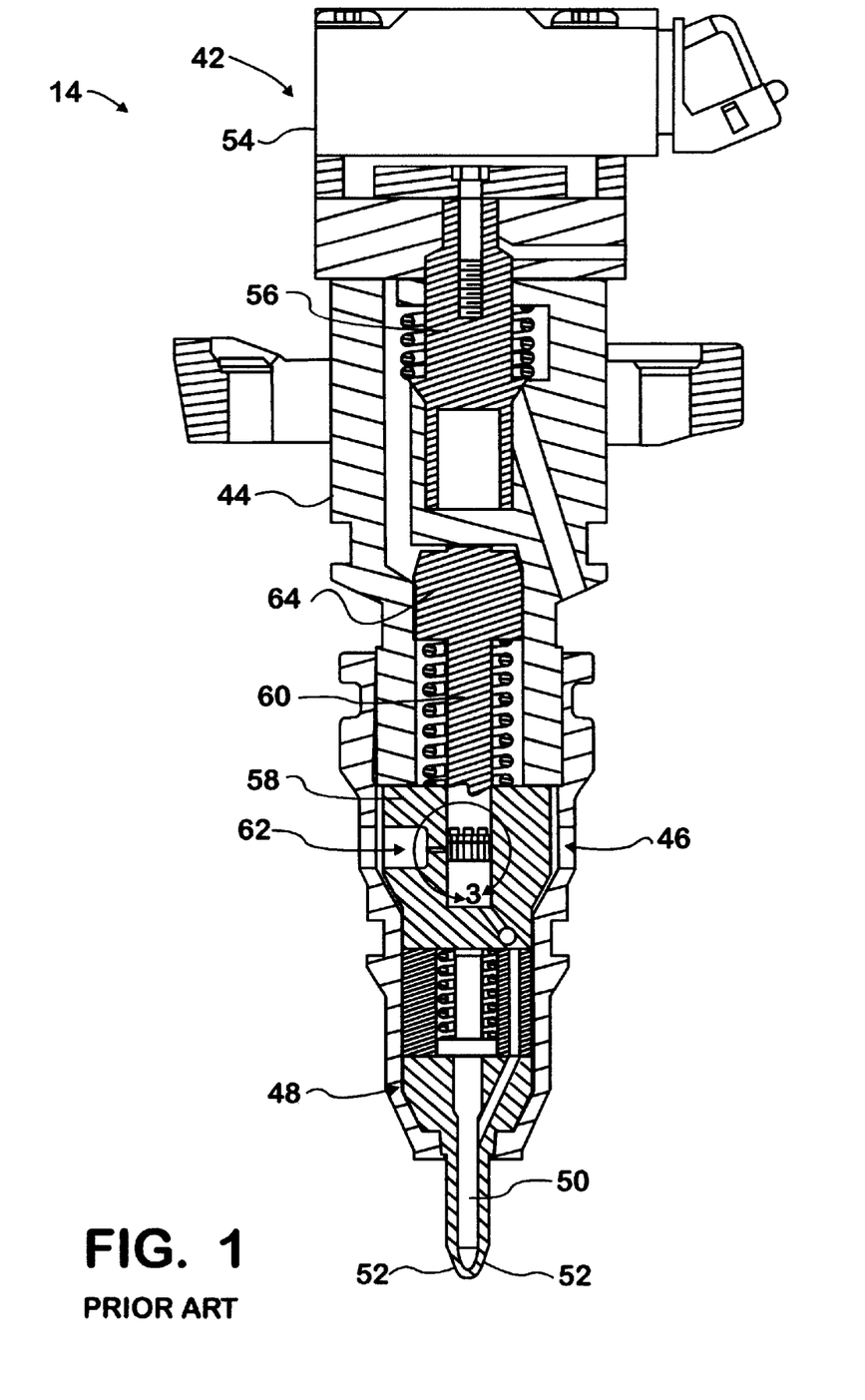
FIG. 1 is a sectional elevational view of an exemplary fuel injector utilized with the connector assembly of the present invention.

An exemplary injector for use with the present invention is shown generally at 14 in FIG. 1. The exemplary injector 14 is described in more detail in U.S. Pat. No. 5,492,098, issued Feb. 20, 1996 to Hafner et al, and incorporated herein by reference. Referring to FIG. 1, the injector 14 is preferably a hydraulically-actuated unit injector (HEUI injector). The injector 14 generally includes an electrical actuator and control valve assembly 42, a body 44, a plunger and barrel assembly 46, and an injection nozzle assembly 48 having a movable flow check 50 and one or more fuel spray orifices 52.

The actuator and valve assembly 42 serves as a means or device for selectively communicating relatively high pressure actuating fluid (preferably engine lubricating oil) from a manifold (rail) to the respective injector 14 in response to receiving an electrical control signal from an injection system electronic control module (not shown). The assembly 42 includes an electrical actuator 54 and a single actuating fluid control valve 56. For example, the actuator 54 may be an on/off-solenoid and the valve 56 may be a poppet valve connected to a movable armature of the solenoid.

The plunger and barrel assembly 46 includes a barrel 58, a reciprocal fuel pump plunger 60, and a spill control device 62 for temporarily or intermittently spilling fuel during the pumping stroke of the plunger 60. The spill control device 62 spills a portion of fuel contained in the high pressure fuel circuit of the injector 14 between the plunger 60 and injection nozzle assembly 48. The barrel 58 and the plunger 60 each define in part the variable volume high pressure fuel pump chamber 66. The chamber 66 comprises an injector pumping volume.

FIG. 1 further depicts an actuating fluid piston 64 integrally connected to the plunger 60. Alternatively, the piston 64 may be a separate movable component positioned adjacent to the plunger 60. Preferably, the actuating fluid piston 64 has a larger effective diameter than the fuel pump plunger 60 in order to effect a pressure intensification of the fuel contained in the high pressure fuel pump chamber 66 and in the rest of the high pressure fuel circuit of the injector 14 leading to the spray orifices 52.

Figure 2:
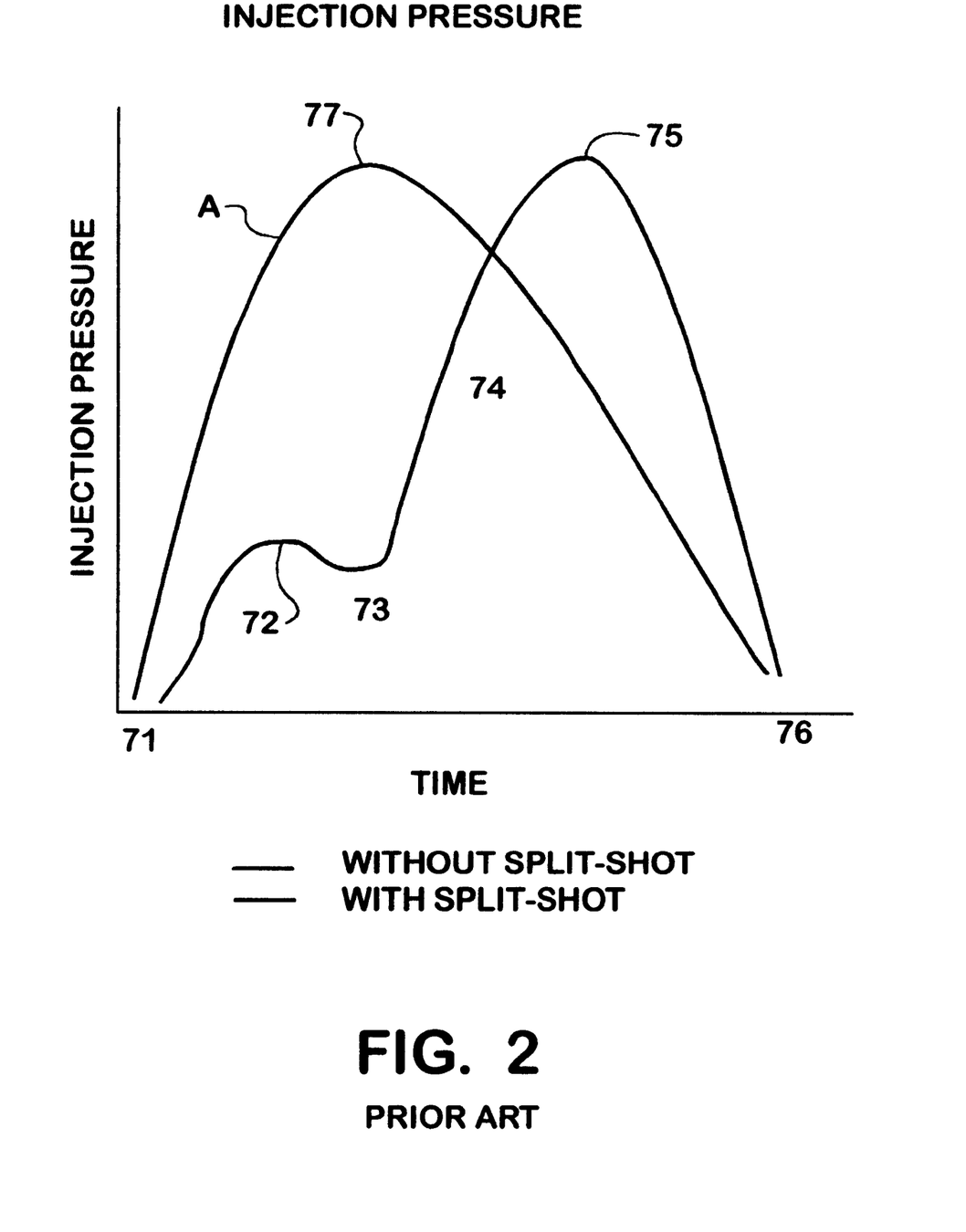
FIG. 2 is a graphic representation of the split shot type injection achievable with the exemplary injector of FIG. 1.

In the past, injectors were capable of producing single shot injection events as depicted in curve A of FIG. 2. The injection event commences at 71, rises to a single peak at 77 and decays to the end of the event at 76. The exemplary injector 14 of FIG. 1 and other more recent injectors are capable of producing the split-shot injection event as depicted in curve B of FIG. 2, a more desirable injection event from the standpoints of emission control, drivability, and noise control. The split-shot injection event is initiated at 71. The initial portion of the event is the prime injection and peaks at 72. After the prime peak 72, injection is terminated for a brief period of time and injection pressure decays as indicated at 73. Main injection then commences and pressure rises as at 74 and peaks at 75. Injection pressure then decays to the termination of the injection event at 76. Such injection typically requires cycling the actuator 54 twice during each injection event.

As indicated above the actuator and valve assembly 42 of the injector 14 is actuated by a high pressure actuating fluid. The actuating fluid may be any of a number of fluids, but is preferably engine lubricating oil. An exemplary lubrication system is as depicted at 80 in FIGS. 3 and 3a. The lubrication system 80 includes an oil pump 81 that circulates lubricating oil through the engine. Additionally, the oil pump 81 supplies oil via a check valve 82 to a reservoir 83. Oil flows from the reservoir 83 to an engine driven high pressure pump 84. The reservoir 83 makes available a constant supply of oil to the high pressure hydraulic pump 84. The high pressure pump 84 may be a gear driven, seven plunger, swash plate pump. The high pressure pump 84 may increase the pressure of the oil to approximately 3,500 psi.

The high pressure pump 84 pumps high pressure oil through high pressure hoses 85. A first high pressure hose 85 goes to the left bank of cylinders depicted in FIGS. 3 and 3a. A second high pressure hose 85 is coupled to a similar right right bank of cylinders (shown in FIG. 3a). The high pressure hoses 85 are fluidly coupled to a cylinder head high pressure rail 87. An injection control pressure sensor 86 is coupled to the cylinder head high pressure rail 87 for control of the oil pressure in the rail 87.

Figure 3:
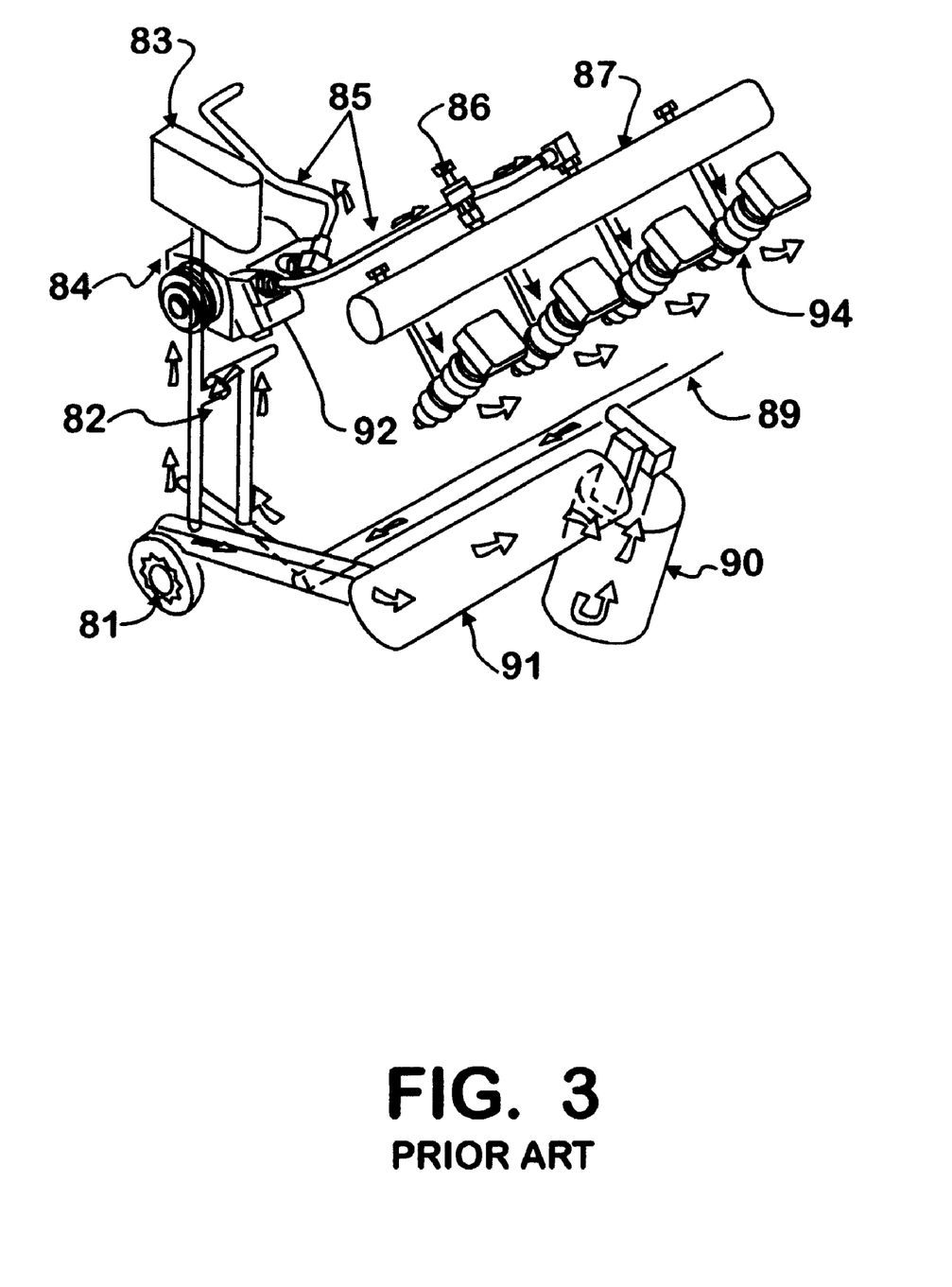
FIG. 3 is a schematic representation of the lubrication system of an engine including the high pressure actuating fluid delivery system.

Each of the fuel injectors 14 for each cylinder on each bank of cylinders is coupled to the cylinder high pressure rail 87 by a connector assembly 100. In an alternative embodiment, the complexity of forming the cylinder high pressure rail 87 in the heads of the engine is avoided by the use of a tubular rail assembly 102. The rail assembly 102 is positioned external to the head proximate the upper margin of the injectors 14 and coupled to the injectors 14 by connector assemblies 100. The rail assembly 102 is described in greater detail below.

The oil pump 81 additionally performs the normal lubrication functions for the engine. Accordingly, the oil pump 81 draws oil from a gallery 89 (crank case main). The oil pump 81 pumps oil at lubricating pressures of approximately 50 psi through an oil cooler 91 and oil filter 90 for lubrication of the engine.

Figure 10:
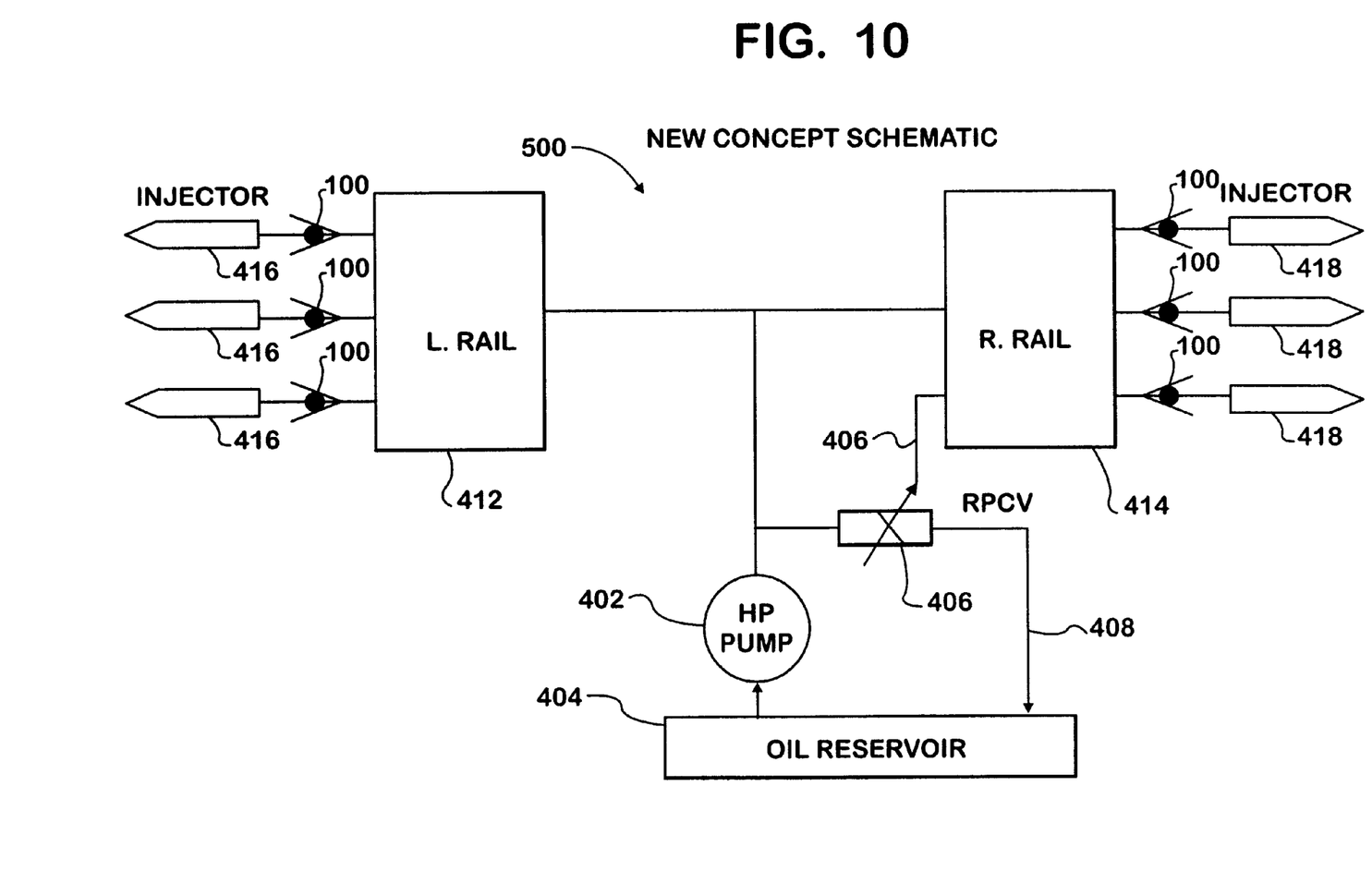
FIG. 10 is a schematic representation of the high pressure actuating fluid system of the present invention for a V type engine.

A connector assembly 100 of the present invention is depicted in FIG. 10 integrated into the high pressure actuating fluid system 500 of the present invention. The components of the system 500 are the same as described above with reference to the prior art system 400 with the exception that the prior art check valves 410 are deleted and the connector assemblies 100 are utilized. It is evident that each of the respective injectors 416, 418 are isolated from the respective servicing rails 412, 414 by the connector assembly associated with each respective injector 416, 418.

Further, cross talk between the rails 412, 414 is eliminated by the connector assemblies 100 of the system 500.

Figure 4:
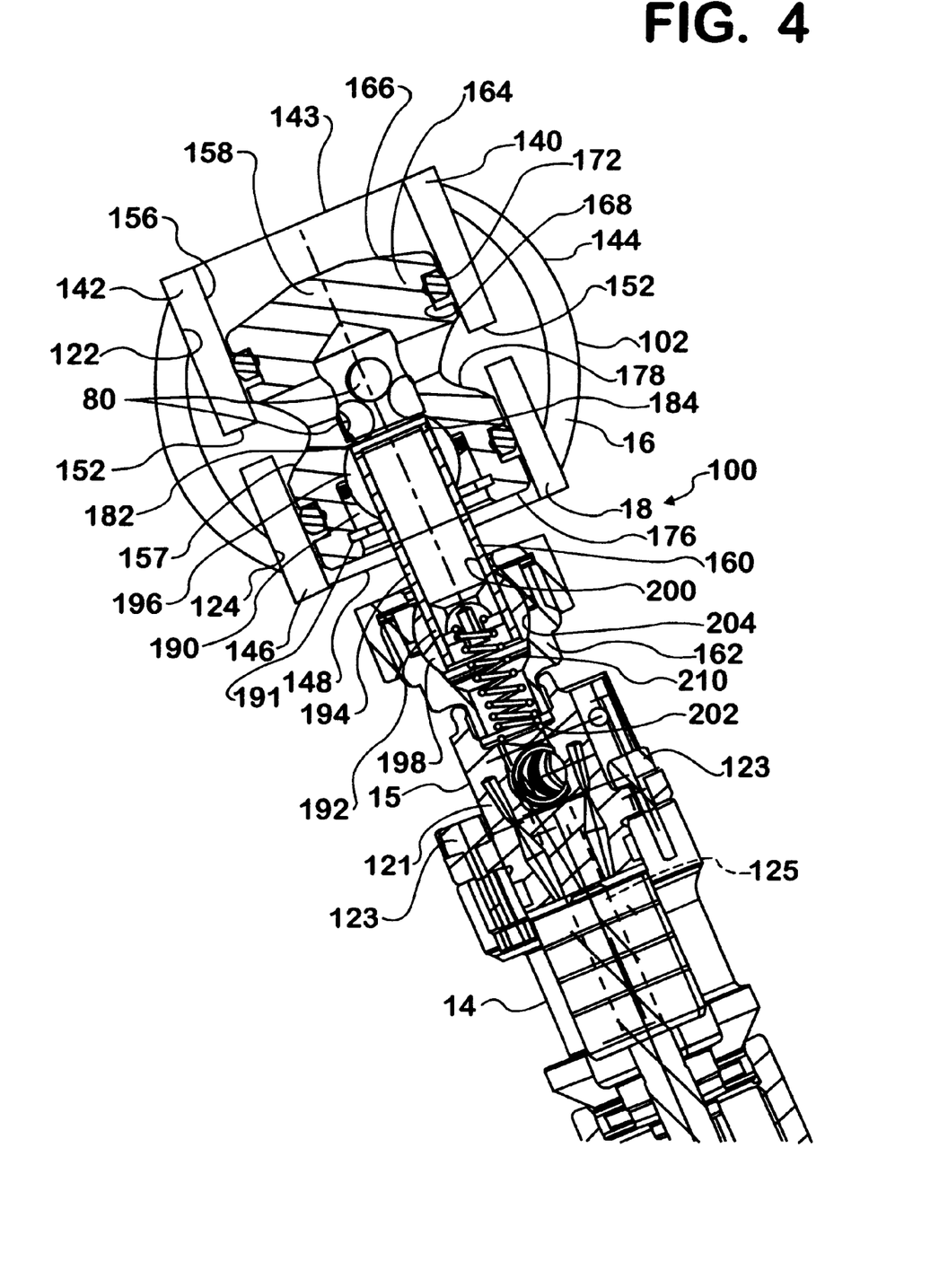
FIG. 4 is a sectional elevational view of the connector assembly of the present invention coupled to a high pressure actuating fluid rail and a fuel injector.
Figure 5:
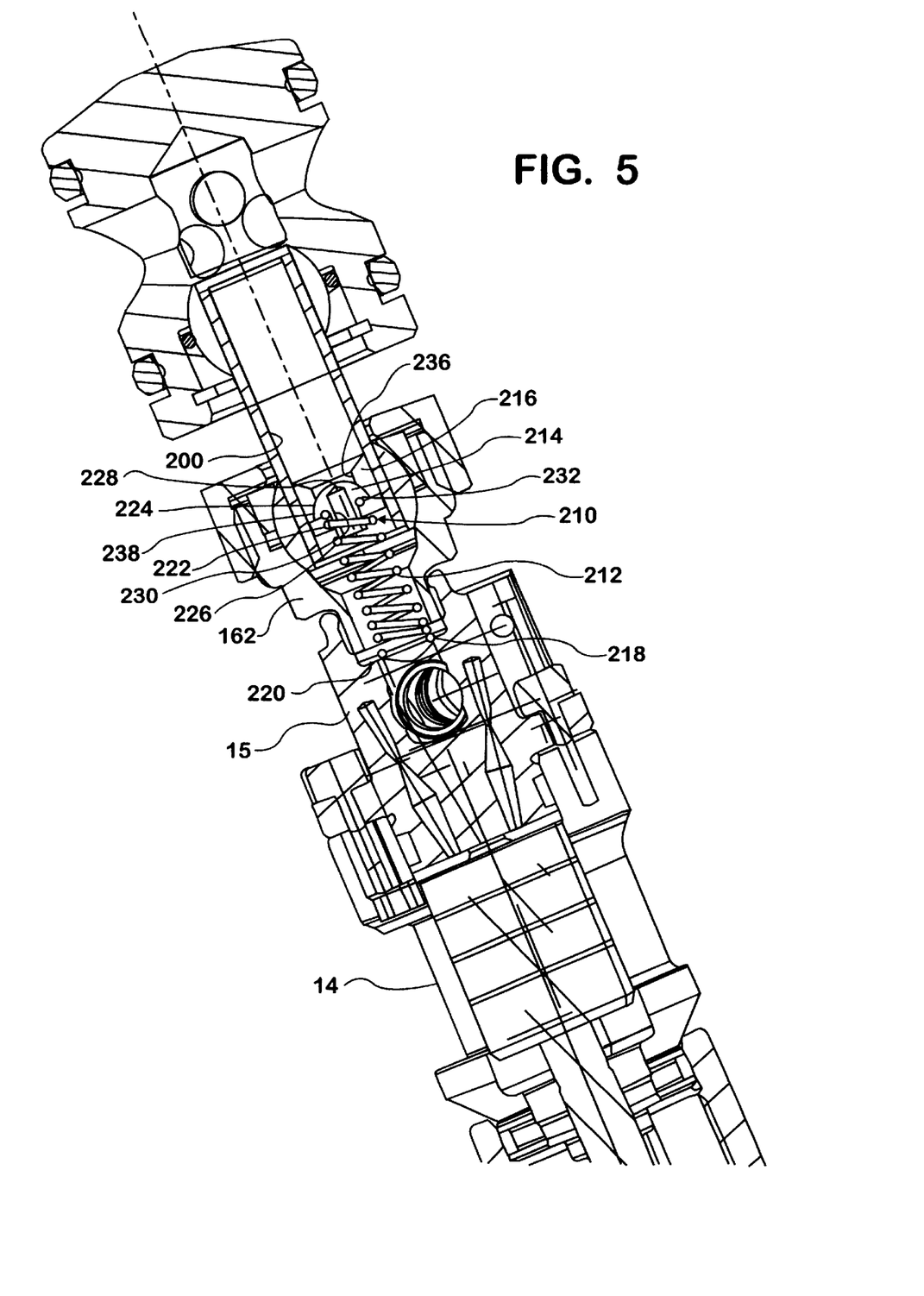
FIG. 5 is an enlarged sectional depiction of the connector assembly of FIG. 4.

A first embodiment of the connector assembly of the present invention is shown generally at 100 in FIGS. 4 and 5. The connector assembly 100 is depicted coupled to an exemplary fuel injector 14, substantially as described above. It is understood that fuel injector 14 is exemplary only and other fuel injectors may be utilized with the connector assembly 100.

The connector assembly 100 fluidly connects the rail assembly 102 and the injector 14. The connector assembly 100 may be directly coupled to the injector 14 or may be coupled to the injector 14 by means of a receiver assembly 15. As depicted in FIGS. 4 and 5, the receiver assembly 15 is mounted on the injector 14. The exemplary receiver 15 has a receiver body 121. The receiver body 121 is fixedly coupled to the exemplary fuel injector 14 by a plurality of cap screws 123. Two cap screws 123 are depicted. A centrally defined actuating fluid passageway 125 extends through the receiver body 121 and into the fuel injector 14. As is described in greater detail below, the actuating fluid passageway 125 is fluidly coupled to the axial fluid bore 200 defined in the tube 160. The actuating fluid passageway 125 comprises the final fluid coupling between the rail assembly 102, the connector assembly 100 of the present invention, and the fuel injector 14.

Referring to FIG. 4, the rail assembly 102 includes two major subcomponents, elongate rail 16 and cross drilled sleeve 18 which may be formed as an integral nodular iron casting. The elongate rail 16 is preferably positioned immediately above a row of fuel injectors 14 on a bank of cylinders. The positioning with respect to a single injector 14 is depicted in FIG. 4. For an inline engine, a single rail assembly 12 is positioned above the row of fuel injectors 14 with the connector assembly 100 fluidly connecting the elongate rail 16 to each of the fuel injectors 14. For a V-form engine as depicted in FIG. 3, the rail assembly 102 includes two elongate rails 16, a rail 16 servicing each of the two banks of cylinders. Each of the elongate rails 16 is fluidly coupled to a source of high pressure actuating fluid as described in reference to FIG. 3 above.

A pair of relatively large bores 122, 124 are defined in the elongate rail 16 proximate each of the fuel injectors 14 to be serviced. Each of the bores 122, 124 are in registry along an axis that is preferably transverse to the longitudinal axis of the elongate rail 16. The elongate rail 16 is preferably fixedly coupled to the cylinder head of the engine by a plurality of clamps (not shown) that are threadedly engaged with the cylinder head such as by a bolt threaded into a bore in the head or a nut threaded onto a stud, the stud being threaded into the head.

The cross drilled sleeve 18 of the rail assembly 102 is comprised of a sleeve cylinder 140. The sleeve cylinder 140 is closely received within the bores 122, 124 of the rail assembly 12. Sleeve cylinder 140 has an upper projection 142. A plane defined by the upper margin 143 of the upper projection 142 is preferably tangential with the exterior surface 144 of the elongate rail 16, thereby defining a flush fitting at the point of tangency. The intersection of the sleeve cylinder 140 with the bore 122 is preferably welded or otherwise suitably fixedly coupled to define a fluid tight intersection between the sleeve cylinder 140 and the bore 122 of the elongate rail 16.

The sleeve cylinder 140 has an opposed lower projection 46 that is similar in construction to the upper projection 142 described above. The intersection of the lower projection 146 with the bore 124 is preferably welded or otherwise suitably fixedly coupled to define a fluid tight intersection. The lower projection 146 forms a flush fitting at the point of tangency of the lower margin 148 of the lower projection 146 with the exterior surface of the elongate rail 16. Accordingly, the longitudinal dimension of the sleeve cylinder 140 is substantially equal to the exterior diameter of the elongate rail 16.

The sleeve cylinder 140 has a cylindrical bore 156 defined therethrough. The sleeve cylinder 140 has a plurality of cross drilled bores 152 preferably equi-angularly spaced around the circumference of the sleeve cylinder 140. In the sectional depiction of FIG. 4, two opposed cross drilled bores 152 of the plurality of bores 152 are depicted. The cylindrical bore 156 defines in-part an annular fluid passageway 157.

The connector assembly 14 of the present invention includes three major subcomponents: upper collar 158, central tube 160, and lower collar 162.

The upper collar 158 of the connector assembly 100 includes a collar body 164. The collar body 164 has a domed top margin 166. An annular groove 168 is defined proximate the domed top surface 166. A ring seal 172 is disposed within the annular groove 168 to define a fluid tight seal between the collar body 164 and the cylinder bore 156 of the sleeve 18. The collar body 164 of the upper collar 158 presents a generally flat bottom margin 176. It should be noted that the bottom face 176 is preferably spaced apart from the lower collar 162 to accommodate relative axial motion between upper collar 158 and lower collar 162 along the longitudinal axis of the connector assembly 100.

An annulus 178 is defined around the collar body 164. The annulus 178, in cooperation with the cylinder bore 156 of the sleeve cylinder 140, defines the annular fluid passageway 157. A plurality of connecting bores 180 defined in the collar body 164 extend inward from the annular fluid passageway 157. The connecting bores 180 are fluidly coupled to an axial bore 182 defined along the longitudinal axis of the connector assembly 100. The axial bore 182 has a generally semi-spherical bore expansion comprising a socket 184. A ring seal 188 is disposed within a stepped groove 186 defined at the lower margin of the socket 184 to effect a fluid tight seal between the upper collar 158 and the central tube 160. A ferrule 190 is disposed in the groove 186 and compressively engages the ring seal 188. The ferrule 190 defines in part the socket 184.

The central tube 160 of the connector assembly 100 includes a tube body 192. The tube body 192 has a tubular center portion 194, an upper spherical end, comprising a ball 196, and a lower spherical end, comprising a ball 198. The balls 196, 198 may be formed integral with the tubular center portion 194. An axial bore 200 is defined along the longitudinal axis. The axial bore 200 is fluidly connected to the upper portion of the axial bore 182 defined in the collar body 164. In assembly, the upper ball 196 of the tube body 192 is rotatably supported in the socket 184 of the collar body 164 by the ferrule 190.

The lower collar 162 of the connector assembly 100 has an internal bore 202 defining in part a socket 204. The lower ball 198 is rotatably supported in the socket 204 by a cap 206. The cap 206 is threadedly engaged with the lower collar 162. The lower collar is operably coupled to the receiver 15.

As best depicted in FIG. 5, an inlet check valve assembly 210 is disposed in the axial bore 200 to the tube body 192 of the connector assembly 100. It is understood that the check valve assembly 210 may be disposed in any connector connecting the rail assembly 102 to the injector 14. As such, the present invention is not limited to the described connector assembly 100, but has more general application. For example, the check valve assembly 210 may be disposed in any of the connector embodiments of the parent applications of the present application. The purpose for the inlet check valve assembly 210 is to limit fluid actuation pulse effects emanating from the injector 14 on the high pressure oil volume existing in the rail assembly 102. The rail assembly 102 is a common volume of oil, which is used to supply high pressure oil to the injector 14. It is important that each injector 14 be exposed to a similar actuating fluid pressure. The drivability and performance response of the engine injection system requires that the high pressure hydraulic actuation portion of the lube system 80, as depicted in FIG. 3, maintain a very stable pressure throughout the operation range of the engine. Significant fluctuations in actuating fluid pressure affect both engine performance and audible emissions from the engine. Pressure waves or pulses in the high pressure portion of the lube system 80 have a significant impact on both the performance and sound characteristics of the engine. The valve 56 of the injector 14 opens and closes preferably within about 350 microseconds. This fast motion causes a high level of water hammer effect in a prior art tubular connector between the rail assembly 102 and the injector 14. The pressure wave inside the tubular connector causes the objectionable high noise level. By incorporating the connector assembly 100 of the present invention in place of the prior art tubular connector, the high pressure spike at the inlet of the valve 66 is prevented from traveling back through the connector assembly 100. As a result, the magnitude of the pressure wave is greatly reduced. By minimizing the pressure dynamics in the connector assembly 100, the pressure dynamics in the rail assembly 102 are also reduced, making for a more stable source of high pressure actuating fluid.

Further, the inlet check valve assembly 210 of the present invention does not impede the flow of high pressure actuating fluid (lubricating oil) into the injector 14. Accordingly, there is no performance penalty resulting from incorporation of the connector assembly 100 of the present invention as compared to a prior art tubular connector. Further, the check ball 214 of the inlet check valve assembly 210 has been designed such that when the valve 56 of the injector 14 opens, the check ball opens only a small portion of its fully open area initially. The reduction in the area of opening allows only a small amount of high pressure actuating fluid to flow into the injector 14. This initial small oil flow acts on the plunger 60. Since the volume of oil (actuating fluid) is small, the fuel pressurization effected by the plunger is also reduced, advantageously causing a reduction in the minimum amount of fuel delivered during pilot injection. Minimizing the amount of fuel delivered during pilot injection has a desirable effect, both enhancing engine performance and reducing engine noise emissions.

The inlet check valve assembly 210 of the present invention includes three major components: spring 212, ball valve 214, and seat 216. The spring 212 has a base 218 supported on a washer 220. The washer 220 may typically be disposed between the lower collar 162 and the receiver 15. The leading end 222 of the spring 212 is engaged with the underside of the ball valve 214. The spring 212 is preferably a coil spring wherein the diameter of the coils undergoes a reduction extending from the base 218 to the leading end 222. This diameter reduction results in a tapered appearance of the spring 212 when the spring 212 is relaxed.

The ball valve 214 has a hemispherical sealing face 224 and a depending base 226. The ball valve 214 is preferably made of a hardened material and is more preferably a steel material. A small bore 228 is defined at the apex of the sealing surface 224. The bore 228 is always open regardless of the disposition of the sealing face 224 with respect to the seat 216. The bore 228 extends into a larger bore 230 defined in the base 226, defining a continuously open fluid path through the ball valve 214.

The base 226 is generally cylindrical in shape and is captured within several of the coils of the spring 212. The leading end 222 of the spring 212 is captured within a circumferential groove defined at the intersection of the base 226 with the sealing surface 224.

The seat 216 is disposed within the bore 200 and may be formed integrally with the central tube 160 or subsequently inserted into the bore 200 and affixed therein. The seat 216 has an axial bore 236. The axial bore 236 extends into a conical sealing surface 238. The bias of the spring 212 urges the hemispherical sealing surface 224 of the ball 214 into sealing engagement with the conical sealing surface 238 of the seat 216, as depicted in FIG. 5. When the ball valve 214 is in the sealed (seated) disposition, the bore 228 remains continuously open for the passage of actuating fluid either to the injector 14 or from the injector 14. In a preferred embodiment, the area of the bore 228 is approximately 5 percent of the flow area defined between the hemispheric sealing surface 224 and the conical sealing surface 228 when the ball valve 214 is in the open disposition. Preferably, the bore 228 is between 0.5 mm and 1.0 mm in diameter. The flow area around the ball valve 214 when the ball valve 214 is in the open disposition is preferably at least 20 mm squared. Further, the total travel of the ball valve 214 between the closed disposition of FIG. 5 and the open disposition is preferably less than 1.5 mm.

Figure 6:
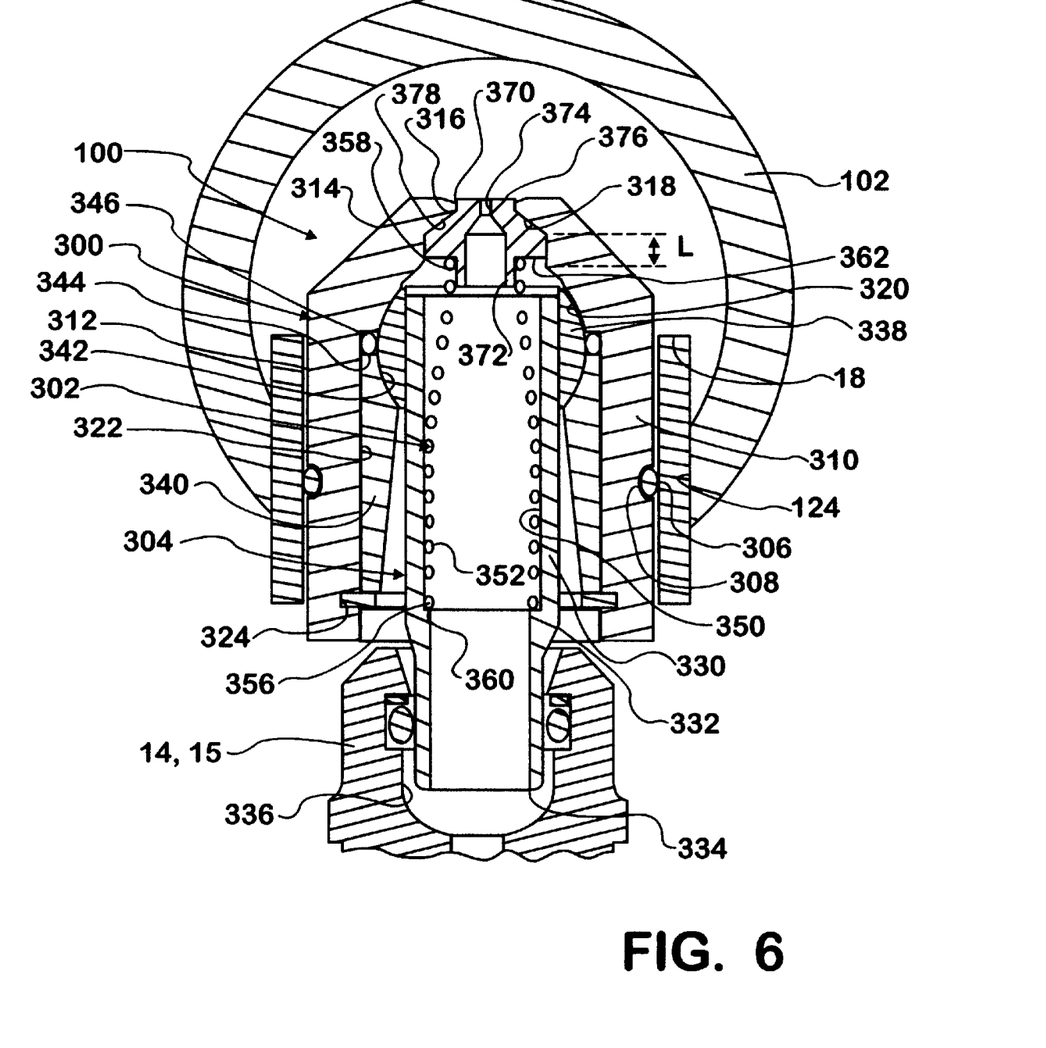
FIG. 6 is a sectional elevational view of an alternative embodiment of the connector assembly of the present invention.
Figure 7:
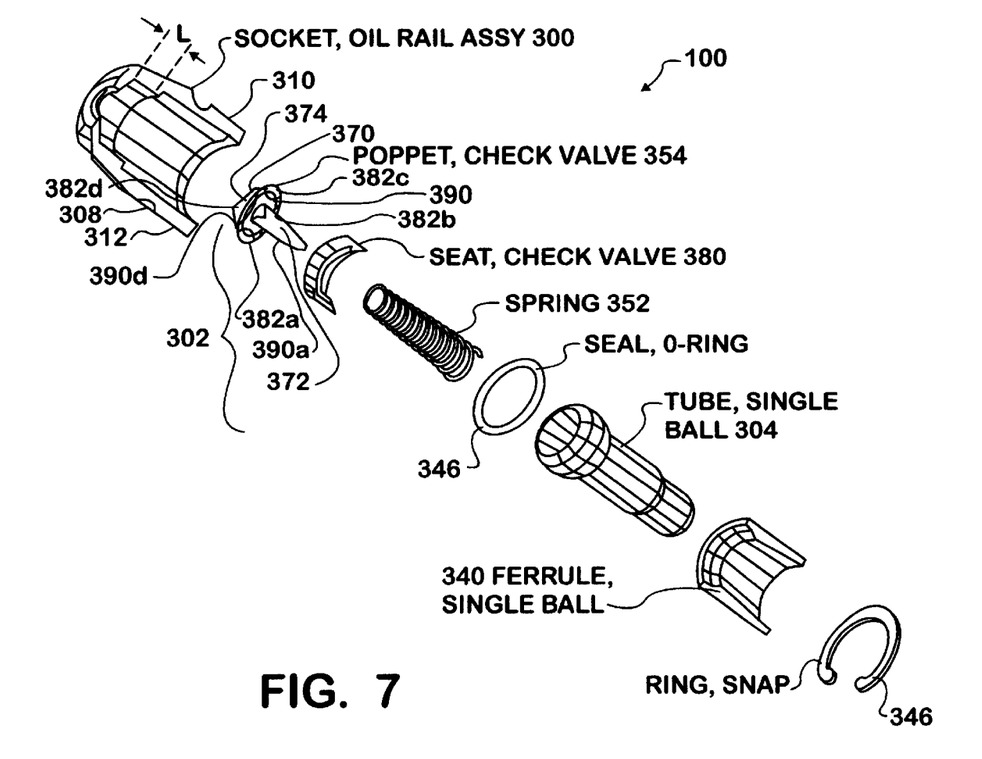
FIG. 7 is an exploded perspective view of an alternative embodiment of the connector assembly of the present invention.

A further preferred embodiment of the connector assembly 100 of the present invention is depicted in FIGS. 6 and 7. As depicted in FIG. 6, the connection assembly 100 is slidably disposed in a sleeve 18 that is welded into a bore 124 defined in the rail assembly 102. Alternatively, the sleeve 18 may be integrally formed with the rail as a nodular iron casting. The connector assembly 100 may be connected either directly to an injector 14 or connected to a receiver 15 that is in turn connected to the injector 14, as described above.

The connector assembly 100 includes three major sub-components: the socket assembly 300, the check valve assembly 302, and the single ball tube assembly 304. The socket assembly 300 includes an O-ring seal 306 disposed in a circumferential groove 308 defined in the exterior surface of the socket body 310. The O-ring seal 306 is held in compressive engagement between the socket body 310 and the inner margin of the sleeve 18 to define a fluid tight seal between the connector assembly 100 and the rail assembly 102. It should be noted that the socket body 310 may be free to translate longitudinally within the sleeve 18. The cylindrical exterior surface 312 of the socket body 310 has a domed upper margin 314. A central bore 316 is defined at the apex of the dome 314.

The bore 316 expands into a conical sealing shoulder 318. The bore 316 further expands to define in part a spherical socket 320 and a generally cylindrical ferrule receiver 322. A snap ring groove 324 is defined proximate the lower margin of the ferrule receiver 322.

The single ball tube assembly 304 generally has a tube body 330. The tube body 330 has a generally cylindrical exterior surface 332. The exterior surface 332 may be slightly reduced in diameter proximate the lower margin thereof in order to be received within an opening 336 defined in the injector 14 or receiver 15, as the case may be. A single ball 338 is formed proximate the upper margin of the single ball tube assembly 304. As indicated in FIG. 6, the ball 338 may be formed separate from the tube body 330 or, as depicted in FIG. 7, the ball 338 may be formed integral and unitary with the tube body 330. The ball 338 rotatably engages the socket 320. A ferrule 340 is positioned concentric with tubular body 330 and received within the ferrule receiver 322. A inner margin 342 of the ferrule 340 defines in part the socket 320. When positioned in the ferrule receiver 322, the upper margin of the ferrule 340 compresses an O-ring seal 346 to form a fluid tight seal between the ball 338, the ferrule 340, and the socket assembly 300. The ferrule 340 is held in position in the socket assembly 300 by a snap ring 346 disposed in the snap ring groove 324.

The check valve assembly 302 is disposed within the axial bore 350 defined in the single ball tube assembly 304 and in the dome 314 of the socket assembly 300. The check valve assembly 302 has two major components: the spring 352 and the check valve poppet 354. The spring 352 has a relatively larger diameter at the base 356 than at the lead end 358. The base 356 is supported on a shoulder 360 formed in the bore 350. The lead end of the spring 352 bears on the underside surface 362 of the check valve poppet 354.

The check valve poppet 354 has a head 370 preferably coupled to a depending base 372. The base 372 is captured within several coils of the spring 352. A bore 374 is defined axially through the check valve poppet 354. The bore 374 is open to the flow of high pressure actuating fluid between the rail assembly 302 and the injector 14 without regard whether the check valve poppet 354 is seated or unseated.

The check valve poppet 354 of FIG. 6 has a generally cylindrical dome 376 that flares outward into a conical sealing surface 378. When the check valve poppet 354 is in the closed (seated) disposition, as depicted in FIG. 6, the conical sealing surface 378 is in sealing engagement with the sealing surface 318. When the check valve poppet 354 is open, the spring 352 is compressed somewhat from the depiction of FIG. 6 and the check valve poppet 354 is moved downward relative to the socket assembly 300 to define a flow area between the conical sealing surface 358 and the sealing surface 318. The dimension L of FIG. 6 defines the height dimension of the conical portion of the bore depending from the sealing surface 318. It is preferable that in the open disposition, the check valve poppet 354 be retained within the cylindrical portion defined by the dimension L. Accordingly, the downward travel of the check valve poppet between the depicted closed disposition and the open disposition is preferably less than the dimension L.

Referring to FIG. 7, the connector assembly 100 is constructed in a substantially similar manner to the connector assembly 100 of FIG. 6. A difference is the imposition of an open check valve seat 380 beneath the check valve poppet 354 in order to limit the downward travel of the check valve poppet 354 of the opening stroke in order to ensure that the head 378 of the check valve poppet 354 stays within the cylindrical bore defined by the dimension L. Accordingly, the open check valve seat 380 preferably limits the travel of the check valve poppet 354 to something less than the dimension L.

Figure 8:
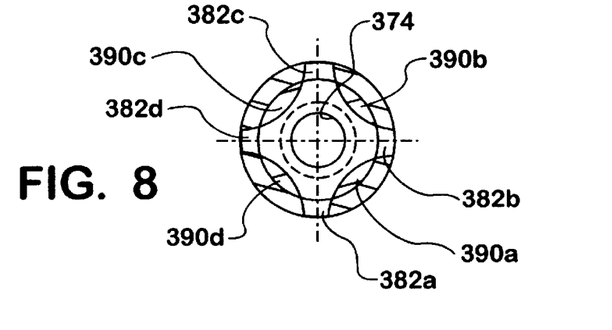
FIG. 8 is a top plan form view of the check valve poppet of FIG. 7.

A further difference in the embodiment of FIG. 7 as compared with the embodiment of FIG. 6 is the shape of the head 378 of the check valve poppet 354. Referring to FIGS. 7 and 8, the check valve poppet 354 has four equi-angularly displaced arms 382a–382d. Scalloped flow areas 390a–390d are defined between the arms 382a–382d.

In operation, a balance is achieved between the bias exerted by the spring 352, the area of the check valve poppet 354 that is presented to the high pressure actuating fluid in the rail assembly 102, and the pressure of the high pressure actuating fluid in the rail assembly 102 such that upon opening of the valve assembly 54 of the injector 14, enough high pressure actuating fluid passes through the bore 374 to initiate a very limited quantity of fuel injected during the pilot injection portion of the injection event. For the main portion of the injection event, the check valve poppet 354 is opened to its full extent and high pressure actuating fluid passes through the flow area defined by the scallops 390a–390d to generate the main injection portion of the injection event. At the termination of both the pilot injection portion and the main injection portion of the injection event, the check valve poppet 354 is in the closed disposition. Only the bore 374 provides fluid communication between the injector 14 and the rail assembly 102. Such minimal open flow area minimizes the water hammer effect on the high pressure actuating fluid of the rail assembly 102 caused by closing of the valve 54 of the injector 14.

What is claimed is:

1. A connector for fluidly coupling an actuating fluid rail to a certain fuel injector, the actuating fluid rail conveying a quantity of high pressure actuating fluid to a plurality of fuel injectors, the connector means comprising:

check means operably disposed in a connecting member for checking the flow of actuating fluid to the actuating fluid rail from the fuel injector, the connecting member having a fluid passageway defined therein, the fluid passageway being in fluid communication with the actuating fluid rail and the fuel injector.

2. The connector of claim 1 wherein the check means is biased in a closed disposition substantially blocking flow of actuating fluid between the actuating fluid rail and the certain injector, pressure of the actuating fluid in the actuating fluid rail acting to overcome the bias to shift the check means from the closed disposition to an open disposition for effecting the conveyance of actuating fluid to the certain fuel injector.

3. The connector of claim 1 wherein the check means acts to minimize pressure pulses generated by operation of the certain fuel injector and acting on the actuating fluid in the certain fuel injector from reaching the actuating fluids conveyed in the actuating fluid rail by substantially closing the connecting member fluid passageway to the flow of actuation fluid from the certain fuel injector to the actuating fluid rail.

4. The connector of claim 1 wherein the check means acts to stabilize the pressure of the actuating fluid conveyed in the actuating fluid rail by substantially closing the connecting member fluid passageway to the flow of actuation fluid from the fuel injector to the actuating fluid rail.

5. The connector of claim 1 wherein the check means acts to minimize the noise emitted from the actuating fluid rail as a result of a water hammer effect generated by operation of the plurality of fuel injectors on the actuating fluid conveyed in the actuating fluid rail, the minimization being effected by substantially closing the connecting member fluid passageway to the flow of actuation fluid from the certain fuel injector to the actuating fluid rail.

6. The connector of claim 1 wherein the check means acts to minimize cross talk between more than one fluidly coupled actuating fluid rails, an actuating fluid rail being associated with each cylinder bank of a multi bank engine, by substantially closing the connecting member fluid passageway to the flow of actuation fluid from the fuel injector to a respective actuating fluid rail.

7. The connector of claim 6 wherein the check means acts to eliminate the need for a check disposed between the more than one fluidly coupled actuating fluid rails for minimizing cross talk between said actuating fluid rails by substantially closing the connecting member fluid passageway to the flow of actuation fluid from the certain fuel injector to the actuating fluid rail.

8. The connector of claim 2 wherein the check means includes a check valve having a spring bias.

9. The connector of claim 8 wherein the check means check valve is seatable in a closed disposition on a closed seat, the closed seat being disposed in the connecting member fluid passageway.

10. The connector of claim 8 wherein the check means check valve has a relatively small area unchecked bore defined therein, the bore being open to the flow of actuating fluid therethrough at all times.

11. The connector of claim 9 wherein the check means further includes an open seat, the check valve being seatable on the open seat when in an open disposition, the open seat being spaced apart from the closed seat and acting to limit travel of the check valve from the closed disposition to the open disposition.

12. The connector means of claim 9 wherein the check means check valve has a substantially hemispherical sealing face, the sealing face being in a substantially sealing engagement with the closed seat when the check valve is seated on the closed seat.

13. The connector of claim 12 wherein the check valve sealing face has a plurality of scalloped surfaces defined therein, the scalloped surfaces defining in part fluid flow areas when the check valve is open to fluid flow.

14. The connector means of claim 12 wherein the spring bias is a coil spring and the check valve sealing face is presented on a valve head exterior margin, a base depending from the valve head, the base being receivable within at least a portion of coils of the biasing spring.

15. A connector assembly for fluidly coupling an actuating fluid rail to a certain fuel injector, the actuating fluid rail conveying a quantity of high pressure actuating fluid, the connector assembly comprising:

a check valve operably disposed in a connecting member for checking the flow of actuating fluid to the actuating fluid rail from the fuel injector, the connecting member having a fluid passageway defined therein, the fluid passageway being in fluid communication with the actuating fluid rail and the fuel injector.

16. The connector assembly of claim 15 wherein the check valve is biased in a closed disposition substantially throttling flow of actuating fluid between the actuating fluid rail and the certain fuel injector, pressure of the actuating fluid in the actuating fluid rail acting to overcome the bias to shift the check valve from the closed disposition to an open disposition for effecting the conveyance of actuating fluid to the fuel injector.

17. The connector assembly of claim 15 wherein the check valve acts to minimize pressure pulses generated by operation of the certain fuel injector and acting on the actuating fluid in the certain fuel injector from reaching the actuating fluid conveyed in the actuating fluid rail by substantially closing the connecting member fluid passageway to the flow of actuation fluid from the certain fuel injector to the actuating fluid rail.

18. The connector assembly of claim 15 wherein the check valve acts to stabilize the pressure of the actuating fluid conveyed in the actuating fluid rail by substantially closing the connecting member fluid passageway to the flow of actuation fluid from the fuel injector to the actuating fluid rail.

19. The connector assembly of claim 15 wherein the check valve acts to minimize the noise emitted from the actuating fluid rail as a result of a water hammer effect generated by operation of the plurality of fuel injectors on the actuating fluid conveyed in the actuating fluid rail, the minimization being effected by substantially closing the connecting member fluid passageway to the flow of actuation fluid from the fuel injector to the actuating fluid rail.

20. The connector assembly of claim 15 wherein the check valve acts to minimize cross talk between more than one fluidly coupled actuating fluid rails, an actuating fluid rail being associated with each cylinder bank of a multi bank engine, by substantially closing the connecting member fluid passageway to the flow of actuation fluid from the fuel injector to the actuating fluid rail.

21. The connector assembly of claim 20 wherein the check valve acts to eliminate the need for a fluid check disposed between the more than one fluidly coupled actuating by substantially closing the connecting member fluid passageway to the flow of actuation fluid from the certain fuel injector to the actuating fluid rail.

22. The connector assembly of claim 16 wherein the check valve includes a spring, the spring biasing the check valve in the closed disposition.

23. The connector assembly of claim 22 wherein the check valve is seatable in the closed disposition on a closed seat, the closed seat being disposed in the connecting member fluid passageway.

24. The connector assembly of claim 16 wherein the check valve has a relatively small area unchecked bore defined therein, the bore being open to the flow of actuating fluid therethrough at all times.

25. The connector assembly of claim 23 wherein the check valve further includes an open seat, the check valve being seatable on the open seat when in the open disposition, the open seat being spaced apart from the closed seat and acting to limit travel of the check valve from the closed disposition to the open disposition.

26. The connector assembly of claim 23 wherein the check valve check valve has a substantially hemispherical sealing face, the sealing face being in a substantially sealing engagement with the close seat when the check valve is on the closed seat.

27. The connector assembly of claim 26 wherein the check valve sealing face has a plurality of scalloped surfaces presented thereon, the scalloped surfaces defining in part fluid flow areas when the check valve is open to fluid flow.

28. The connector assembly of claim 26 wherein the spring bias is a coil spring and the check valve sealing face is presented on a valve head exterior margin, a base depending from the valve head, the base being receivable within at least a portion of the coils of the biasing spring.

29. An actuating fluid system for use with an engine having at least one bank of cylinders, the actuating fluid system having a high pressure pump providing high pressure actuation fluid to an actuating fluid rail servicing a plurality of fuel injectors of each bank of the at least one bank of cylinders, there being no check between the high pressure pump and the actuating fluid rail servicing each bank of the at least one bank of cylinders, a connector assembly for fluidly coupling an actuating fluid rail to a fuel injector, the actuating fluid rail conveying a quantity of actuating fluid, the fuel injector having an actuating fluid inlet, the connector assembly comprising:

a check valve operably disposed in a connecting member for checking the flow of actuating fluid to the actuating fluid rail from a certain fuel injector, the connecting member having a fluid passageway defined therein, the fluid passageway being in fluid communication with the actuating fluid rail and the certain fuel injector actuating fluid inlet.

30. The actuating fluid system of claim 29 wherein the check valve is biased in a closed disposition substantially throttling flow of actuating fluid between the actuating fluid rail and the certain fuel injector, pressure of the actuating fluid in the actuating fluid rail acting to overcome the bias to shift the check valve from the closed disposition to an open disposition for effecting the conveyance of actuating fluid to the fuel injector.

31. The actuating fluid system of claim 30 wherein the check valve acts to minimize pressure pulses generated by operation of the certain fuel injector and acting on the actuating fluid in the certain fuel injector from affecting the actuating fluid conveyed in the actuating fluid rail, said minimization being effected by substantially closing the connecting member fluid passageway to the flow of actuation fluid from the fuel injector to the actuating fluid rail.

32. The actuating fluid system of claim 30 wherein the check valve acts to stabilize the pressure of the actuating fluid conveyed in the actuating fluid rail by substantially throttling the flow of actuation fluid from the fuel injector to the actuating fluid rail in the connecting member fluid passageway.

33. The actuating fluid system of claim 30 wherein the check valve acts to minimize the noise emitted by the actuating fluid rail as a result of a water hammer effect generated by operation of the plurality of fuel injectors fluidly coupled to the actuating fluid rail on the actuating fluid conveyed in the actuating fluid rail, said minimization being effected by substantially throttling the flow of actuation fluid from the fuel injector to the actuating fluid rail in the connecting member fluid passageway.

34. The actuating fluid system of claim 30 wherein the check valve acts to minimize cross talk between more than one actuating fluid rails by substantially throttling the flow of actuation fluid from the certain fuel injector to the actuating fluid rail to which the connector assembly is coupled.

* * * * *